US008042016B2

(12) United States Patent
Park et al.

(10) Patent No.: US 8,042,016 B2
(45) Date of Patent: Oct. 18, 2011

(54) METHOD AND DEVICE FOR EFFICIENTLY RETRANSMITTING PACKETS IN WIRED/WIRELESS NETWORK

(75) Inventors: Noseong Park, Seoul (KR); Yoonmee Doh, Daejeon (KR); Sun Joong Kim, Daejeon (KR); Cheol Sig Pyo, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1134 days.

(21) Appl. No.: 11/774,650

(22) Filed: Jul. 9, 2007

(65) Prior Publication Data
US 2008/0082891 A1    Apr. 3, 2008

(30) Foreign Application Priority Data
Sep. 29, 2006    (KR) .................. 10-2006-0096428

(51) Int. Cl.
  *H04L 1/18* (2006.01)
  *G06F 11/00* (2006.01)
  *H04B 3/36* (2006.01)
  *H04B 1/44* (2006.01)
  *H04B 17/02* (2006.01)
  *H04J 3/24* (2006.01)
(52) U.S. Cl. .............. 714/748; 714/749; 714/18; 455/7; 370/282; 370/473; 375/213; 375/224
(58) Field of Classification Search .................. 714/749, 714/748, 18; 455/7; 370/282, 473; 375/213, 375/224
See application file for complete search history.

(56) References Cited

U.S. PATENT DOCUMENTS

| 7,143,330 | B2 * | 11/2006 | Ahn et al. ...................... 714/748 |
| 7,653,856 | B2 * | 1/2010 | Ahn et al. ...................... 714/748 |
| 7,882,412 | B2 * | 2/2011 | Nanda ............................ 714/748 |
| 2005/0169199 | A1 | 8/2005 | Futenma et al. |
| 2006/0018332 | A1 * | 1/2006 | Kakani et al. .................. 370/428 |
| 2006/0048034 | A1 | 3/2006 | Cho |
| 2010/0180172 | A1 * | 7/2010 | Weimann et al. ............. 714/750 |

FOREIGN PATENT DOCUMENTS
KR    1020030066431    8/2003

OTHER PUBLICATIONS

Li et al., Performance Analysis of the IEEE 802.11e Block ACK Scheme in a Noisy Channel, Oct. 3, 2005, IEEE, vol. 1, pp. 511-517.*
Yuan et al., High-Performance MAC for High-Capacity Wireless LANs, Oct. 11, 2004, IEEE, pp. 167-172.*
Wall et al., Adaptive Multimedia Packet Transmission for Broadband IEEE 802.11 Wireless LANS, Sep. 11, 2006, IEEE, pp. 1-5.*
Ksentini et al., Toward an Improvement of H.264 Video Transmission over IEEE 802.11e through a Cross-Layer Architecture, Jan. 2006, IEEE, vol. 44, pp. 107-114.*

* cited by examiner

*Primary Examiner* — John J Tabone, Jr.
(74) *Attorney, Agent, or Firm* — Ladas & Parry LLP

(57) ABSTRACT

Provided a method and device for efficiently retransmitting packets of which transmissions failed in wired/wireless network including detecting continuity by detecting whether or not a sequence ID of a received packet is continuous with a start sequence ID or an end sequence ID of packets included in reception blocks which are generated in advance of the received packet; depending on the result of the detection, manipulating reception blocks to renew or delete the reception blocks or generate a new reception block by using the sequence ID of the received packet; and transmitting an EBN (Explicit Block NACK) for requesting retransmission of lost packets in units of a block when discontinuity is detected.

20 Claims, 9 Drawing Sheets

METHOD AND DEVICE FOR EFFICIENTLY RETRANSMITTING PACKETS IN WIRED/WIRELESS NETWORK

CROSS-REFERENCE TO RELATED PATENT APPLICATION

This application claims the benefit of Korean Patent Application No. 10-2006-0096428 filed on Sep. 29, 2006, in the Korean Intellectual Property Office, the disclosure of which is incorporated herein in its entirety by reference.

BACKGROUND OF THE INVENTION

1. Field of the Invention

The present invention relates to a method and device for retransmitting packets in a wired/wireless network, and more particularly, to a method and device for efficiently detecting packets for which transmission has failed in a wired/wireless network and transmitting a negative acknowledgement message (NACK) only once for a block of packets for which transmission has failed many times, so that it is possible to efficiently retransmit packets.

2. Description of the Related Art

In a wired/wireless network, a transmission apparatus transmits packets, and when a reception apparatus does not receive the transmitted packets the transmission apparatus retransmits the packets. The wired/wireless network includes an Ethernet, an Ad-hoc network, and a sensor network. In each network technology, retransmission is needed, and a packet transmission rate is affected by a retransmission method.

A method of transmitting and receiving an acknowledgement message (ACK) is generally used as a packet retransmission method. For example, in the IEEE 802.15.4 standard for the sensor network, when an ACK is not received within a predetermined time after transmitting a packet, retransmission is attempted.

However, in the method of transmitting the explicit ACK for each packet, the ACK transmission and reception occupies transmission media, and thus there is a problem in that a data packet transmission rate decreases. In addition, due to an ACK algorithm, the amount of overhead calculation increases.

In order to increase the packet transmission rate, a method of using an ACK algorithm which has high performance and is complex is used. However, in this method, the overhead of the ACK algorithm increases, and thus there is a problem in that the method cannot be used in a subminiature device such as a sensor node.

An invention "Method and Apparatus for Transmitting Block ACK Frame" disclosed in U.S. Patent Publication No. 20060048034 (publication date 2006 Mar. 2) proposes a method and apparatus for transmitting a block ACK. In this method, a block ACK is transmitted to a transmission apparatus using a compressed bitmap format, and the size of the block ACK is reduced, so that transmission time and error probability can be reduced. However, a compression algorithm and bitmap manipulation are required, and calculation complexity is high, and thus there is a problem in that the method cannot be used in the subminiature device.

SUMMARY OF THE INVENTION

The present invention provides a packet retransmission request method and device capable of increasing a packet transmission rate by reducing overhead of a needed acknowledgement (ACK) algorithm and the number of control packets, when a reception apparatus requests a retransmission in a wired/wireless network, and being used for a subminiature device.

The present invention also provides a packet retransmission method and apparatus capable of increasing a packet transmission rate by reducing overhead of a needed ACK algorithm and the number of control packets, when a reception apparatus requests retransmission of packets in a wired/wireless network, and being used for a subminiature device.

According to an aspect of the present invention, there is provided a packet retransmission request method used in a reception apparatus in a wired/wireless network, the method including: detecting continuity by detecting whether or not a sequence ID of a received packet is continuous with a start sequence ID or an end sequence ID of packets included in reception blocks which are generated in advance of the received packet; depending on the result of the detection, manipulating reception blocks to be renewed or deleted or generating a new reception block by using the sequence ID of the received packet; transmitting an EBN (Explicit Block NACK) for requesting retransmission of lost packets in units of a block when discontinuity is detected.

According to another aspect of the present invention, there is provided a packet retransmission method used in a transmission apparatus in a wired/wireless network, the method including: sequentially transmitting packets to be transmitted while increasing sequence IDs of the packets by 1 without waiting for ACK (acknowledgement message) signals from a reception apparatus in a wired/wireless network; and retransmitting packets having sequence IDs included in the EBN when an EBN for requesting retransmission of lost packets in units of a block is received from the reception apparatus.

According to another aspect of the present invention, there is provided a packet retransmission request device used in a reception apparatus in a wired/wireless network, the device including: a continuity detection unit detecting that a sequence ID of a received packet is continuous with a start sequence ID or an end sequence ID of packets included in reception blocks that are generated in advance of the received packet; a reception block manipulation unit renewing or deleting the reception blocks or generating a new reception block by using the sequence ID of the received packet according to a result of detection; and an EBN transmission unit transmitting an EBN for requesting retransmission of lost packets in units of a block when discontinuity is detected.

According to another aspect of the present invention, there is provided a packet retransmission device used in a transmission apparatus in a wired/wireless network, the device including: a sequential transmission unit transmitting packets while increasing sequence IDs of the packets by 1 without waiting for ACK signals from a reception apparatus in a wired/wireless network; and a retransmission unit retransmitting packets having sequence IDs included in the EBN when an EBN for requesting retransmission of lost packets in units of a block is received from the reception apparatus.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, exemplary embodiments according to the present invention will be described in detail with reference to the accompanying drawings.

Before the description of the drawings, the present invention is schematically described as follows.

A transmission apparatus transmits packets while increasing sequence IDs of the packets by 1 without waiting for acknowledgement messages (ACK) on the supposition that the packet transmission always succeeds. When the sequence IDs of the packets received from the transmission apparatus are not continuous, a reception apparatus perceives a transmission failure of intermediate packets and explicitly transmits a negative acknowledgement message (NACK) to the transmission apparatus. The transmission apparatus retransmits the corresponding packets only when it receives a NACK, which indicates transmission failure of the packets. In this case, the reception apparatus does not individually transmit NACKs for packets that failed to be transmitted, but the reception apparatus transmits a NACK only once for a block which corresponds to the packets that failed to be transmitted.

The transmission apparatus stores a predetermined number of packets in order to retransmit the packets when it receives the NACK. The number of packets to be stored by the transmission apparatus and calculation of overhead that is used to execute an explicit block NACK (EBNACK) algorithm, or the like can be predicted by mathematical analysis and controlled according to circumstances.

Figure 1:
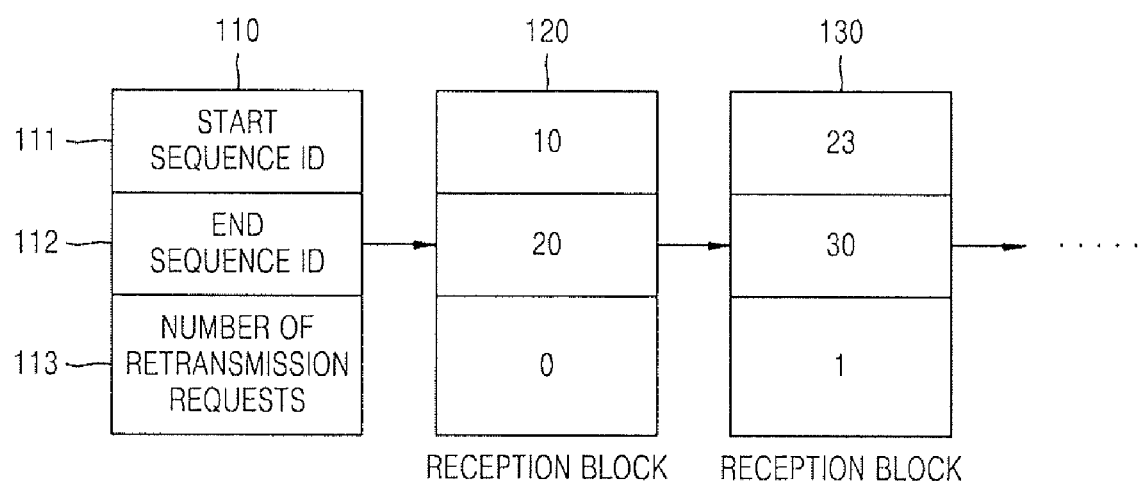
FIG. 1 is a view showing a structure of reception blocks used in a packet retransmission method used by a reception apparatus according to an embodiment of the present invention.

FIG. 1 is a view showing a structure of reception blocks used in a packet retransmission method used by a reception apparatus according to an embodiment of the present invention.

Referring to FIG. 1, the reception apparatus manages packets received from transmission apparatuses in units of a block. Reception blocks 110, 120, and 130 include a sequence ID (start sequence ID 111) of a packet which has the earliest sequence ID from among the packets sequentially received without packet loss and a sequence ID (end sequence ID 112) of a packet which has the latest sequence ID from among the packets sequentially received without packet loss. More preferably, the number of retransmission requests 113 from the reception apparatus may be included therein.

The reception apparatus sets the start and end sequence IDs of the reception blocks in ascending order. In the meantime, the transmission apparatus transmits packets while increasing sequence IDs of the packets by 1.

In FIG. 1, the first reception block 120 shows that packets having sequence IDs from 10 to 20 are received without loss, and the second reception block 130 shows that packets having sequence IDs from 23 to 30 are received without loss.

However, packets between the first reception block 120 and the second reception block 130, that is, packets having sequence IDs 21 and 22, are lost. In this case, the reception apparatus transmits an explicit block NACK (EBN) for requesting retransmission of the packets having sequence IDs 21 and 22 and increases the number of retransmission requests of the second reception block 130 by 1.

Figure 2:
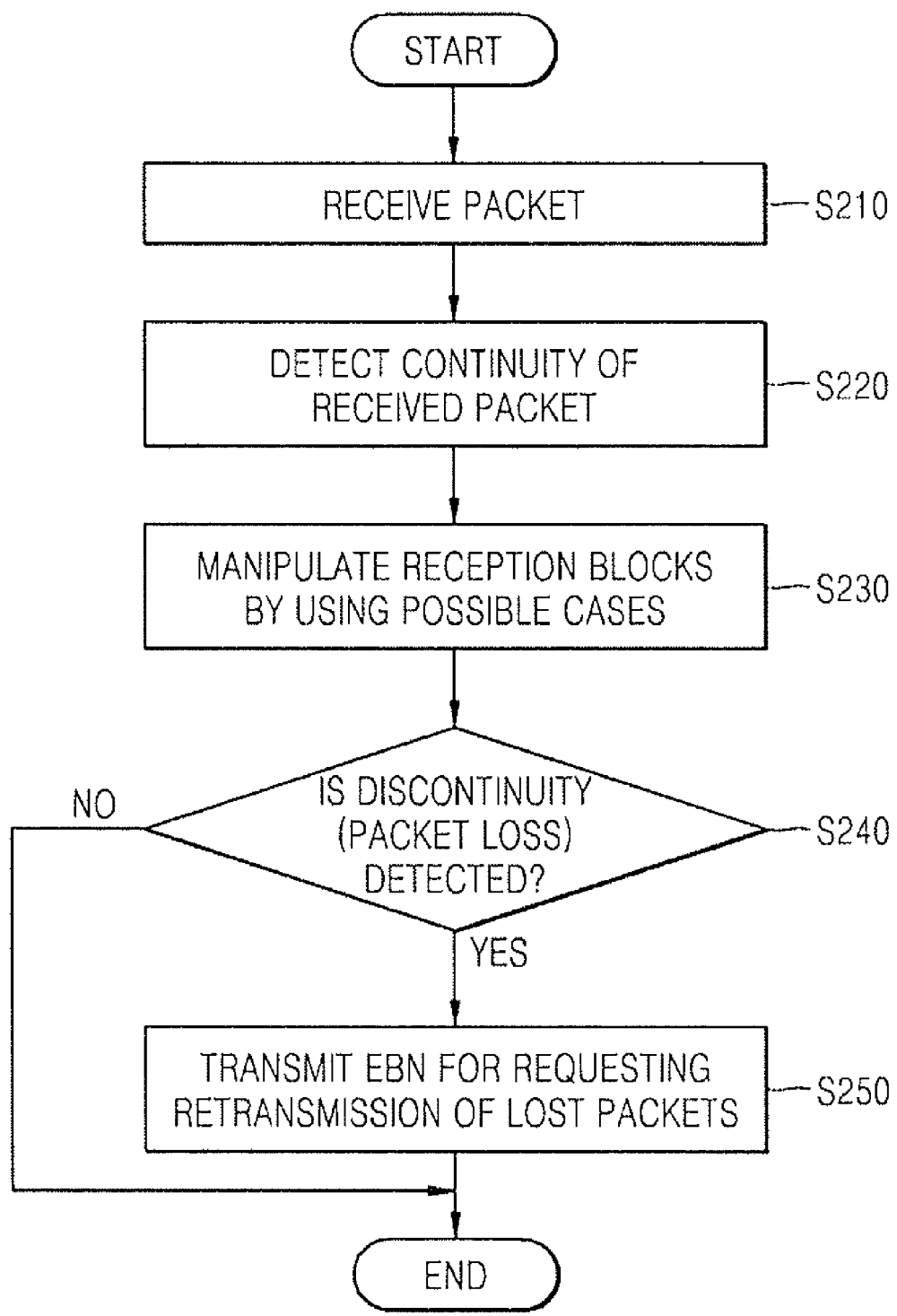
FIG. 2 is a flowchart showing a packet retransmission request method used by a reception apparatus according to an embodiment of the present invention.

FIG. 2 is a flowchart showing a packet retransmission request method used by a reception apparatus according to an embodiment of the present invention.

Referring to FIG. 2, the packet retransmission request method used by the reception apparatus in a wired/wireless network according to an embodiment of the present invention includes detecting continuity (operation S220), manipulating reception blocks (operation S230), and transmitting an EBN (operation S250).

More specifically, when the reception apparatus receives a packet from the transmission apparatus (operation S210), it is determined whether or not a sequence ID of the received packet is continuous with sequence IDs of packets included in the reception blocks that are generated in advance (operation S220). In this case, all the packets included in the reception blocks need not necessarily be retrieved, and only a start sequence ID and an end sequence ID recorded in the reception blocks need be retrieved.

Next, according to the determination regarding the sequence ID of the received packet, the reception blocks are renewed or deleted, or a new reception block is generated using the sequence ID of the received packet (operation S230). Several or many reception blocks that are generated in advance may exist, and various forms of reception blocks may exist, so that various cases have to be considered in order to manipulate the reception blocks. Possible cases are described in detail with reference to FIGS. 3 to 11.

When discontinuity is detected (operation S240), packets are lost, and the transmission apparatus is requested to retransmit the packets. More specifically, an EBN for requesting retransmission of the lost packets in units of a block is transmitted to the transmission apparatus. A format of the EBN packet basically includes a start sequence ID and an end sequence ID of the packets requested to be retransmitted and may further include other information as needed.

Hereinafter, descriptions will be provided of manipulation methods in nine possible cases where reception blocks are manipulated by the reception apparatus.

Figure 3:
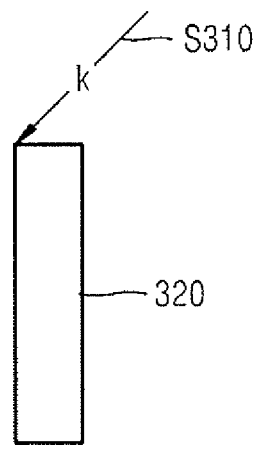
FIG. 3 is a view showing a manipulation method in a first possible case where reception blocks are manipulated according to an embodiment of the present invention.

FIG. 3 is a view showing a manipulation method in a first possible case where reception blocks are manipulated according to an embodiment of the present invention.

Referring to FIG. 3, in the first case, the reception apparatus receives a packet having a sequence ID k in a state where a reception block does not exist yet (operation S310). In this case, first, a new reception block 320 is generated, and a start sequence ID and an end sequence ID of the reception block 320 are set to k, which is the sequence ID of the received packet. The number of retransmission requests is set to 0 of course. Since there are no lost packets, an EBN is not transmitted.

Now, in order to simplify the reception blocks, representation using the letters (a, b, c) is used. The a, b, and c of the representation denote a start sequence ID, an end sequence ID, and the number of retransmission requests of a reception block, respectively.

Figure 4:
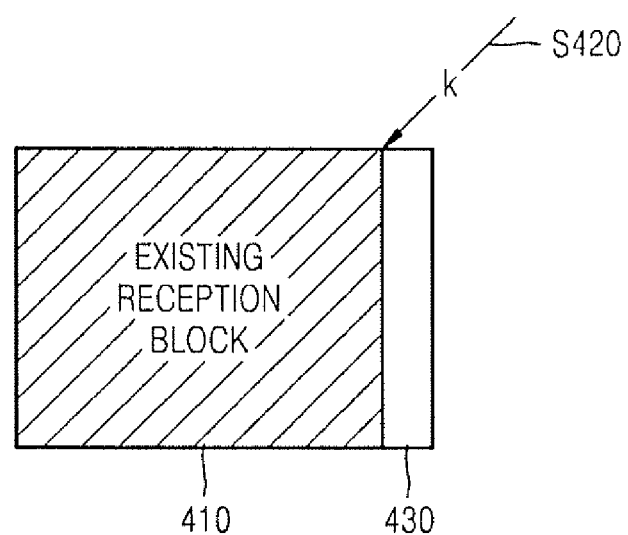
FIG. 4 is a view showing a manipulation method in a second possible case where reception blocks are manipulated according to an embodiment of the present invention.

FIG. 4 is a view showing a manipulation method in a second possible case where reception blocks are manipulated according to an embodiment of the present invention.

Referring to FIG. 4, in the second case, the reception apparatus receives a packet having a sequence ID k in a state where a reception block 410 that is generated in advance exists (operation S420), and the sequence ID k of the packet is continuous with an end sequence ID of the existing reception block 410.

In this case, a new reception block for a received packet region 430 is not generated, and the end sequence ID of the existing reception block 410 is simply renewed to k. In addition, since there are no lost packets, an EBN is not transmitted. For example, when it is assumed that a start sequence ID of the existing reception block 410 is g, and the number of retransmission requests is 0, the existing reception block 410 is renewed to (g, k, 0).

Figure 5:
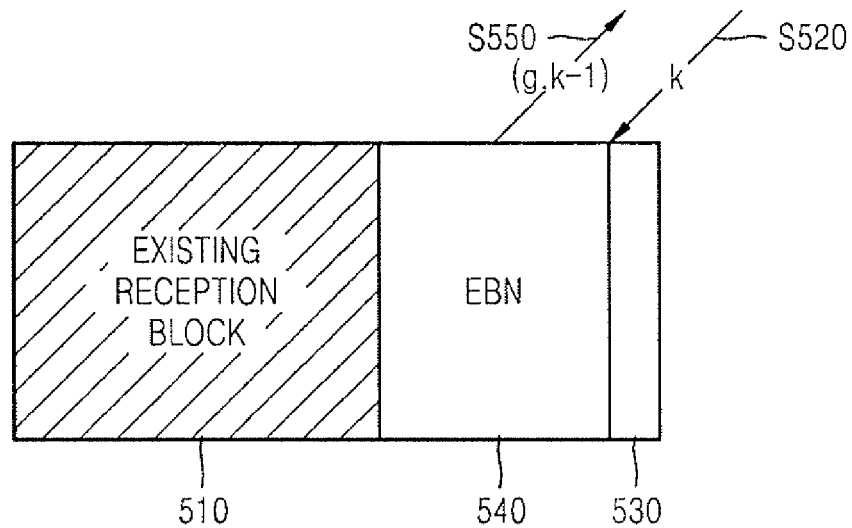
FIG. 5 is a view showing a manipulation method in a third possible case where reception blocks are manipulated according to an embodiment of the present invention.

FIG. 5 is a view showing a manipulation method in a third possible case where reception blocks are manipulated according to an embodiment of the present invention.

Referring to FIG. 5, in the third case, the reception apparatus receives a packet having a sequence ID k in a state where one or more reception blocks that are generated in advance exist (operation S520), and the sequence ID k of the packet is discontinuous with an end sequence ID of a existing reception block 510 that has the latest end sequence ID from among the existing reception blocks.

In this case, first, a new reception block 530 of (k, k, 0) is generated. Packets 540 having sequence IDs between the existing reception block 510 having the latest end sequence ID and the generated reception block 530 of (k, k, 0) are lost, and thus an EBN for requesting retransmission of the packets 540 is transmitted to the transmission apparatus (operation S550).

Figure 12:
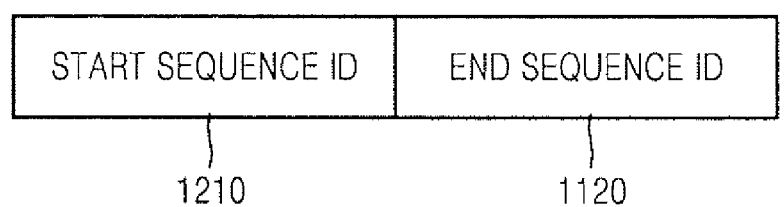
FIG. 12a is a view showing a format of an explicit block NACK (EBN) packet.
FIG. 12b is a view showing a format of a data packet including an s-bit.
Figure 12:
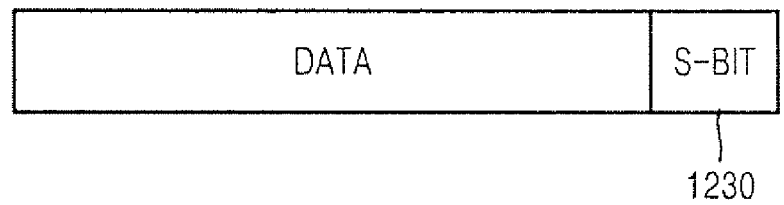

Now, in order to simplify the EBN, representation using the letters (e, f) is used. The e and f of the representation denote a start sequence ID and an end sequence ID of packets which are requested to be retransmitted, respectively. For example, assuming that an end sequence ID of the existing reception block is g−1, packets having sequence IDs from g to k−1 are lost, and thus an EBN for (g, k−1) is transmitted. A packet structure of the EBN is described in detail in FIG. 12.

After transmitting the EBN, the number of retransmission requests of the generated reception block 530 of (k, k, 0) is increased by 1 in order to renew the reception block 530 as (k, k, 1).

More preferably, after the EBN is transmitted, a timer is set. When the timer is expired, a processing method used when the timer is expired is used. This processing method will now be described. This method is commonly applied in the description in FIGS. 5, 6, and 9 when the timer that is set after transmitting the EBN is expired. Hereinafter, the method in FIG. 5 is exemplified.

Referring to FIG. 5, when the timer is expired after the EBN is transmitted (operation S550), it is determined whether or not the reception block 530 which transmitted the EBN still exists. When the reception block 530 is deleted and does not exist, a retransmission operation is immediately ended. Otherwise, retransmission of packets having sequence IDs between a start sequence ID of the reception block 530 and an end sequence ID of an immediately prior reception block is requested. Here, the immediately prior reception block may be the existing reception block 510 or a reception block between the reception block 510 and the reception block 530, which is generated in the process of retransmitting packets after the EBN transmission.

Here, the number of retransmission requests of the reception block 530 is increased by 1. When the number of retransmission requests exceeds a predetermined critical value, retransmission is not requested, the end sequence ID of the immediately prior reception block is renewed by setting it to an end sequence ID of the reception block 530, and the reception block 530 is deleted. Namely, when the number of retransmission requests exceeds a critical value, the reception apparatus does not request retransmission any more. The critical value is controlled according to circumstances of the transmission apparatus or the reception apparatus.

Hereinafter, FIGS. 6 to 11 illustrate cases which can occur when packets that are requested to be retransmitted by means of the EBN in FIG. 5 are received. Here, the transmission apparatus first retransmits a packet having the earlier sequence ID from among the packets that are requested to be retransmitted. However, packets may arrive at the reception apparatus in different sequences from the retransmitting sequences of the transmission apparatus along a transmission path. Accordingly, various cases may occur.

Figure 6:
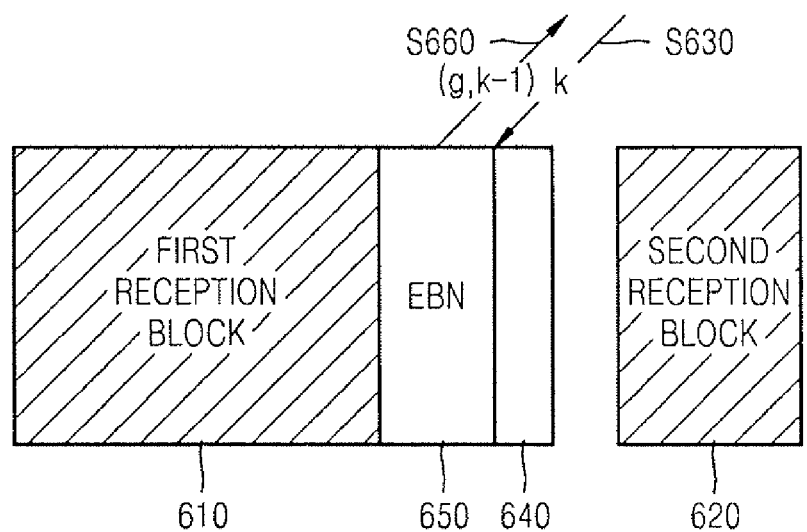
FIG. 6 is a view showing a manipulation method in a fourth possible case where reception blocks are manipulated according to an embodiment of the present invention.

FIG. 6 is a view showing a manipulation method in a fourth possible case where reception blocks are manipulated according to an embodiment of the present invention.

Referring to FIG. 6, in the fourth case, the reception apparatus receives a packet having a sequence ID k in a state where two or more reception blocks that are generated in advance exist (operation S630), and the sequence ID k of the packet is between an end sequence ID of a first reception block 610 and a start sequence ID of a second reception block 620 and discontinuous with any one of the start and end sequence IDs.

In this case, a new reception block 640 of (k, k, u) is generated for the received packet. The u means the number of retransmission requests of the second reception block 620.

In order to request retransmission of packets 650 having discontinuous sequence IDs between the first reception block 610 and the new reception block 640, the new reception block 640 transmits an EBN to the transmission apparatus (operation S660) and sets a timer. Thereafter, the number of retransmission requests of the new reception block 640 which transmitted the EBN is increased by 1. Therefore, in the current embodiment, the new reception block 640 becomes (k, k, u+1). When the timer is expired, the method used in FIG. 5 is used.

Figure 7:
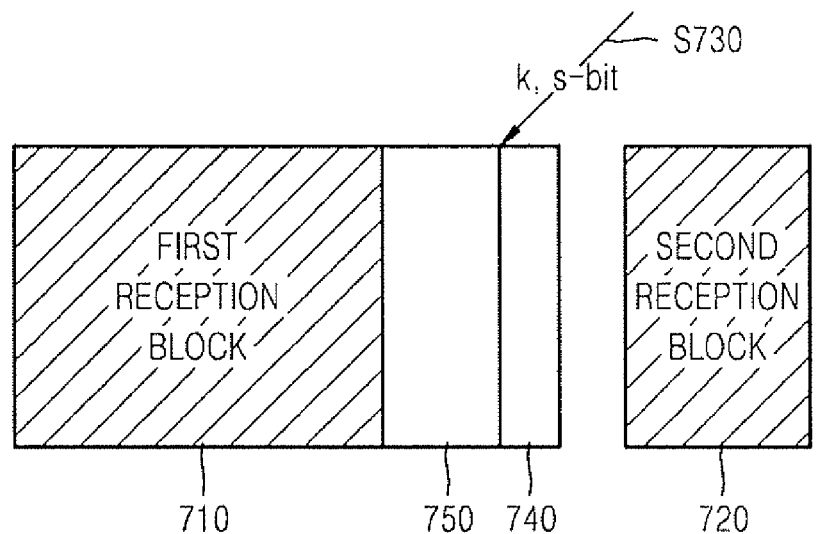
FIG. 7 is a view showing a manipulation method in a fifth possible case where reception blocks are manipulated according to an embodiment of the present invention.

FIG. 7 is a view showing a manipulation method in a fifth possible case where reception blocks are manipulated according to an embodiment of the present invention.

Referring to FIG. 7, in the fifth case, the reception apparatus receives a packet having a sequence ID k and in which an s-bit is set in a state where two or more reception blocks that are generated in advance exist (operation S730), and the sequence ID k of the packet is between an end sequence ID of a first reception block 710 and a start sequence ID of a second reception block 720 and discontinuous with any one of the start and end sequence IDs.

The s-bit is an identification bit which represents that a packet including the s-bit has the earliest sequence ID from among packets, the packets are stored in the transmission apparatus can be transmitted, when the transmission apparatus stores only parts of packets which are requested to be retransmitted by means of the EBN. The s-bit is generally set to 1, but may be set to another value in a different system. The s-bit is further described in detail with reference to FIG. 12.

Receiving a packet in which the s-bit is set means that packets having earlier sequence IDs than the packet including the s-bit were already deleted. Namely, packets 750 corresponding to a reception block between the first reception block and the packet region 740 do not exist any more in the transmission apparatus. Therefore, there is no use requesting retransmission of the packets 750.

Therefore, when a packet in which an s-bit is set is received (operation S730), the reception apparatus does not generate an independent reception block of (k, k, u) for the packet region 740 in which the s-bit is set and simply renews an end sequence ID of the existing first reception block 710, which is the immediately prior reception block, by setting the sequence ID to k. In this case, it is assumed that the packets 750 having sequence IDs from an end sequence ID of the previous first reception block 710 to k are received by the reception apparatus, so that the reception apparatus does not request retransmission of the packets.

This is because the transmission apparatus does not store the corresponding packets from among the already transmitted packets and cannot retransmit the packets. The transmission apparatus unavoidably admits that packet transmission has failed. In this case, there is a problem in that intermediate packets are lost. However, when the intermediate packets are important, a network layer and a transmission layer can request packets having different sequence IDs in a MAC layer with respect to the lost packets. In addition, in order to keep a probability of failure of the packet transmission below a predetermined level, in the present invention, the number of packets to be stored by the transmission apparatus is defined. This will later be described in detail when explaining an Explicit Block NACK (EBNACK) algorithm.

Figure 8:
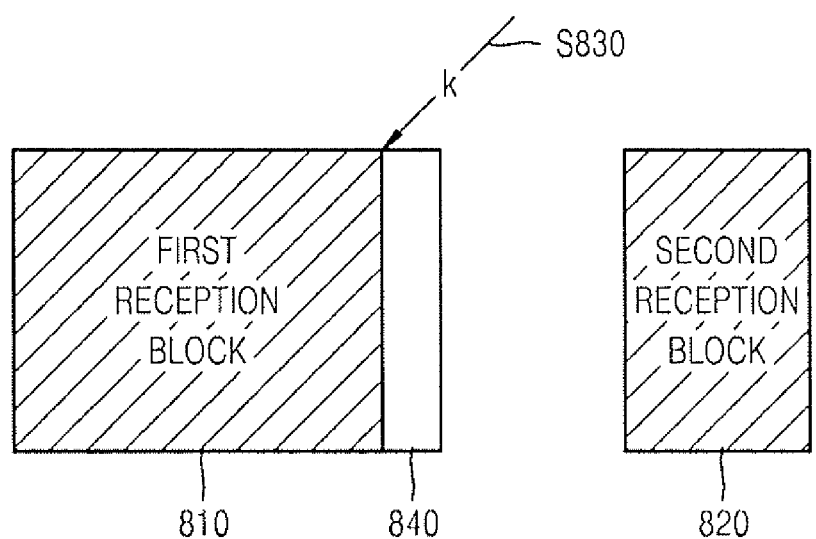
FIG. 8 is a view showing a manipulation method in a sixth possible case where reception blocks are manipulated according to an embodiment of the present invention.

FIG. 8 is a view showing a manipulation method in a sixth possible case where reception blocks are manipulated according to an embodiment of the present invention.

Referring to FIG. 8, in the sixth case, the reception apparatus receives a packet having a sequence ID k in a state where two or more reception blocks that are generated in advance exist (operation S830), and the sequence ID k of the packet is continuous with an end sequence ID of a first reception block 810 and discontinuous with a start sequence ID of a second reception block 820.

In this case, the reception apparatus does not generate an independent reception block of (k, k, u) for the received packet region 840 and simply renews the end sequence ID of the existing first reception block 810, which is the immediately prior reception block, by setting the end sequence ID to k.

Figure 9:
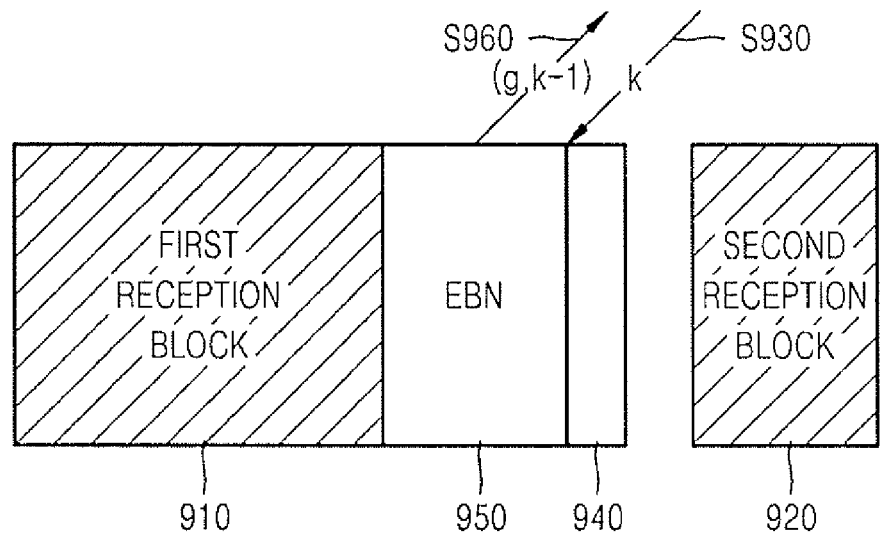
FIG. 9 is a view showing a manipulation method in a seventh possible case where reception blocks are manipulated according to an embodiment of the present invention.

FIG. 9 is a view showing a manipulation method in a seventh possible case where reception blocks are manipulated according to an embodiment of the present invention.

Referring to FIG. 9, in the seventh case, the reception apparatus receives a packet having a sequence ID k in a state where two or more reception blocks that are generated in advance exist (operation S930), and the sequence ID k of the packet is discontinuous with an end sequence ID of a first reception block 910 and continuous with a start sequence ID of a second reception block 920.

In this case, the reception apparatus does not generate an independent reception block for the received packet region 940 and renews the start sequence ID of the existing second reception block 920, which is the immediately after reception block, by setting the start sequence ID to k.

Here, the start sequence ID k of the renewed second reception block 920 is still discontinuous with the end sequence ID of the first reception block 910, which is the immediately prior reception block. Therefore, in order to request retransmission of the lost packets 950 between the first reception block 910 and the renewed second reception block 920, an EBN is transmitted again (operation S930). In addition, a timer is set, and the number of retransmission requests of the second reception block 920 is increased by 1. When the timer is expired, the method used in FIG. 5 is used.

Figure 10:
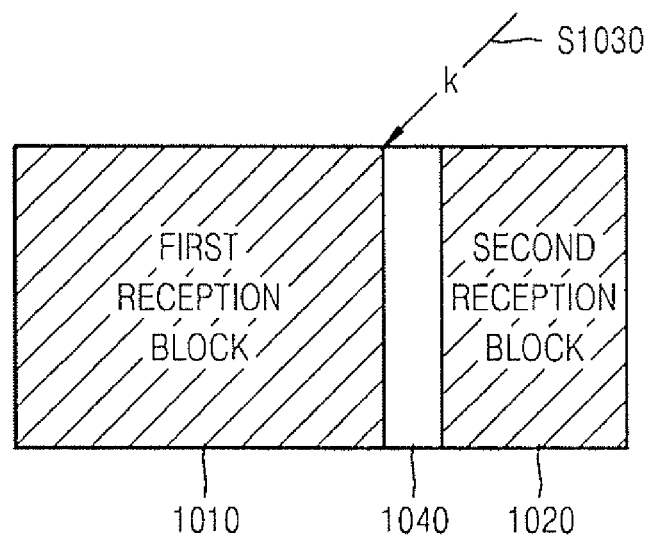
FIG. 10 is a view showing a manipulation method in an eighth possible case where reception blocks are manipulated according to an embodiment of the present invention.

FIG. 10 is a view showing a manipulation method in an eighth possible case where reception blocks are manipulated according to an embodiment of the present invention.

Referring to FIG. 10, in the eighth case, the reception apparatus receives a packet having a sequence ID k in a state where two or more reception blocks that are generated in advance exist (operation S1030), and the sequence ID k of the packet, an end sequence ID of a first reception block 1010, and a start sequence ID of a second reception block 1020 are continuous.

In this case, an independent reception block for the received packet region 1040 is not generated, the end sequence ID of the first reception block 1010 is renewed by setting it to an end sequence ID of the second reception block 1020, and the second reception block 1020 is deleted.

Figure 11:
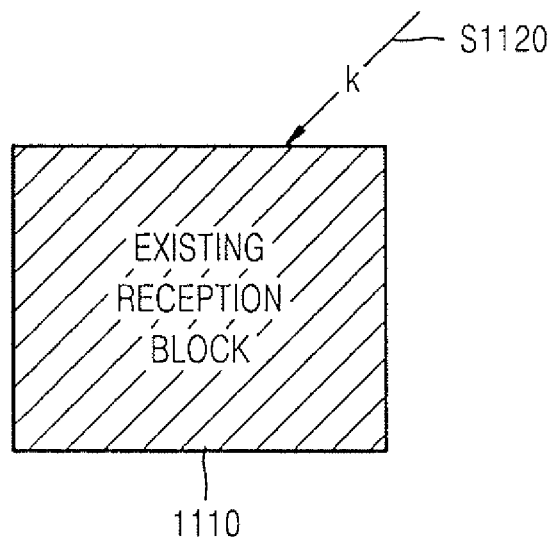
FIG. 11 is a view showing a manipulation method in a ninth possible case where reception blocks are manipulated according to an embodiment of the present invention.

FIG. 11 is a view showing a manipulation method in a ninth possible case where reception blocks are manipulated according to an embodiment of the present invention.

Referring to FIG. 11, in the ninth case, the reception apparatus receives a packet having a sequence ID k in a state where one or more reception blocks 1110 that is generated in advance exists (operation S1120), and the sequence ID k of the received packet is between a start sequence ID and an end sequence ID of the existing reception block 1110.

This case means that the packet is repeatedly transmitted by the transmission apparatus. Therefore, the received packet is simply ignored.

The retransmission request method using an EBN and the manipulation methods in nine possible cases where reception blocks are manipulated have been described above. Hereinafter, the retransmission request method using an EBN is called an EBNACK algorithm.

The EBNACK algorithm has to be used in a subminiature device such as a sensor node, and thus the algorithm has a requirement of low overhead. In the present embodiment, it is described that the EBNACK algorithm, which is proposed by using a mathematical analysis, has very low overhead. In the mathematical analysis described later, an EBNACK algorithm having a calculation complexity of O(1) is introduced.

Whenever a packet is received, the EBNACK algorithm has to examine all of the reception blocks in order to perceive which case from among the aforementioned nine possible cases applies to the received packet. In the meantime, a large amount of processing time is used. A reception block is generated when a next successive packet is received after one packet or a continuous series of packets fail to be received.

Here, if X is a random variable representing the number of continuous packet transmission failures occurring until a success occurs, X follows a geometric distribution.

Here, when a probability of success of a packet transmission is p, an expectation E[X] of the random variable X is 1/p. When the number of packets transmitted per second is a, a reception block is generated every 1/pa seconds. Therefore, when a balance condition of Equation 1 is satisfied, the speed at which the reception blocks disappear is faster than or the same as the speed at which the reception blocks are generated, so that the calculation complexity of O(1) is guaranteed.

In the balance condition of Equation 1, k denotes the maximum number of retransmission requests, and T denotes a timer expiration time that is set when an EBN is transmitted.

$$1/pa \leq kT \qquad \text{[Equation 1]}$$

The transmission apparatus has to store packets that are transmitted once, in order to respond to a retransmission request of the reception apparatus. However, since a memory capacity of a subminiature device such as the sensor node may not be enough, the maximum number of packets to be stored has to be limited.

By using a mathematical analysis described later, a method of determining in advance a probability value representing successive retransmission of packets with respect to a retransmission request of the reception apparatus and setting the number of packets to be stored in order to satisfy the probability value is described.

For example, a mathematical analysis of the number of packets to be stored after transmission thereof in order to guarantee that the transmission apparatus can respond to a retransmission request with a 99.9% probability is described. In other words, the minimum number of packets to be stored by the transmission apparatus in order to guarantee the probability that packets requested to be retransmitted are not stored and cannot be transmitted is only 0.1% is mathematically analyzed.

As described in the analysis of the calculation complexity of the EBNACK algorithm, when a transmission success occurs after a failure or continuous failures, the reception apparatus can detect whether or not packets are lost. Therefore, a probability of a success after continuous failures has to be larger than or the same as a probability value p' which is set by a user as an objective.

$$Pr[\text{At least one success until k packets when a packet is transmitted}] \geq p'$$

This can be represented as a conditional probability as follows.

$$Pr[\text{At least one success until } k \text{ packets} | \text{a packet is transmitted}] \geq p'$$

However, events for transmitting packets are independent from each other, so that a condition in which packets were transmitted may be removed. Accordingly, $$Pr[\text{At least one success until k packets}] \geq p'$$

$$1 - Pr[\text{All packet fails}] \geq p'$$

When a probability of failure of each packet transmission is q, the equation described above can be represented as follows.

$$1 - q^k \geq p', \ (q: \text{transmission failure probability})$$

$$q^k \leq 1 - p'$$

Since q is less than 1, log with base q is applied to both sides, and Equation 2 can be obtained as follows.

$$\log_q(1-p') \leq k \qquad \text{[Equation 2]}$$

Therefore, when the number of packets which are stored after the transmission apparatus transmitted the packets is more than $\log_q(1-p)$, a probability of storage of the corresponding packets in the transmission apparatus when the reception apparatus requests retransmission of packets for which transmission failed can be guaranteed to be more than a probability value p' which is determined by the user as an objective.

As described above, since the transmission apparatus stores k packets, the reception apparatus only needs to manage reception blocks corresponding to the k most recent packets. Therefore, if reception blocks corresponding to packets having sequence IDs less than a number obtained by subtracting k from a sequence ID of the most recent packet are all deleted, the calculation complexity of the EBNACK algorithm can be lowered by O(k/2) even when the balance condition is not satisfied. This is because the greatest number of reception blocks is generated while k packets are received when a success and a failure alternately and occur. The complexity O(k/2) is low enough to be properly used for a subminiature device such as the sensor node.

FIG. 12a is a view showing a format of an EBN packet, and FIG. 12b is a view showing a format of a data packet including an s-bit.

Referring to FIG. 12a, the EBN is used to request retransmission of packets having sequence IDs between a start and an end of lost sequence IDs, so that a format of the EBN packet may include a start and an end sequence IDs of packets that are requested to be retransmitted. Other information can be added thereto as needed.

The transmission apparatus has to retransmit the packets after receiving the EBN from the reception apparatus. However, when packets having sequence IDs between a start and an end of lost sequence IDs are not all stored, a problem occurs. When a packet corresponding to the start of the loss sequence IDs is not stored and cannot be retransmitted, a packet having the earliest sequence ID and in which and an s-bit representing the aforementioned situation is set is retransmitted. The s-bit is generally set to 1. The reception apparatus then perceives that the transmission apparatus does not store the packets having sequence IDs between the start of the loss sequence IDs and the retransmitted sequence ID, and thus the reception apparatus does not request retransmission of the corresponding packets.

Referring to FIG. 12b, a data packet including an s-bit can be implemented by adding a bit to general data.

Figure 13:
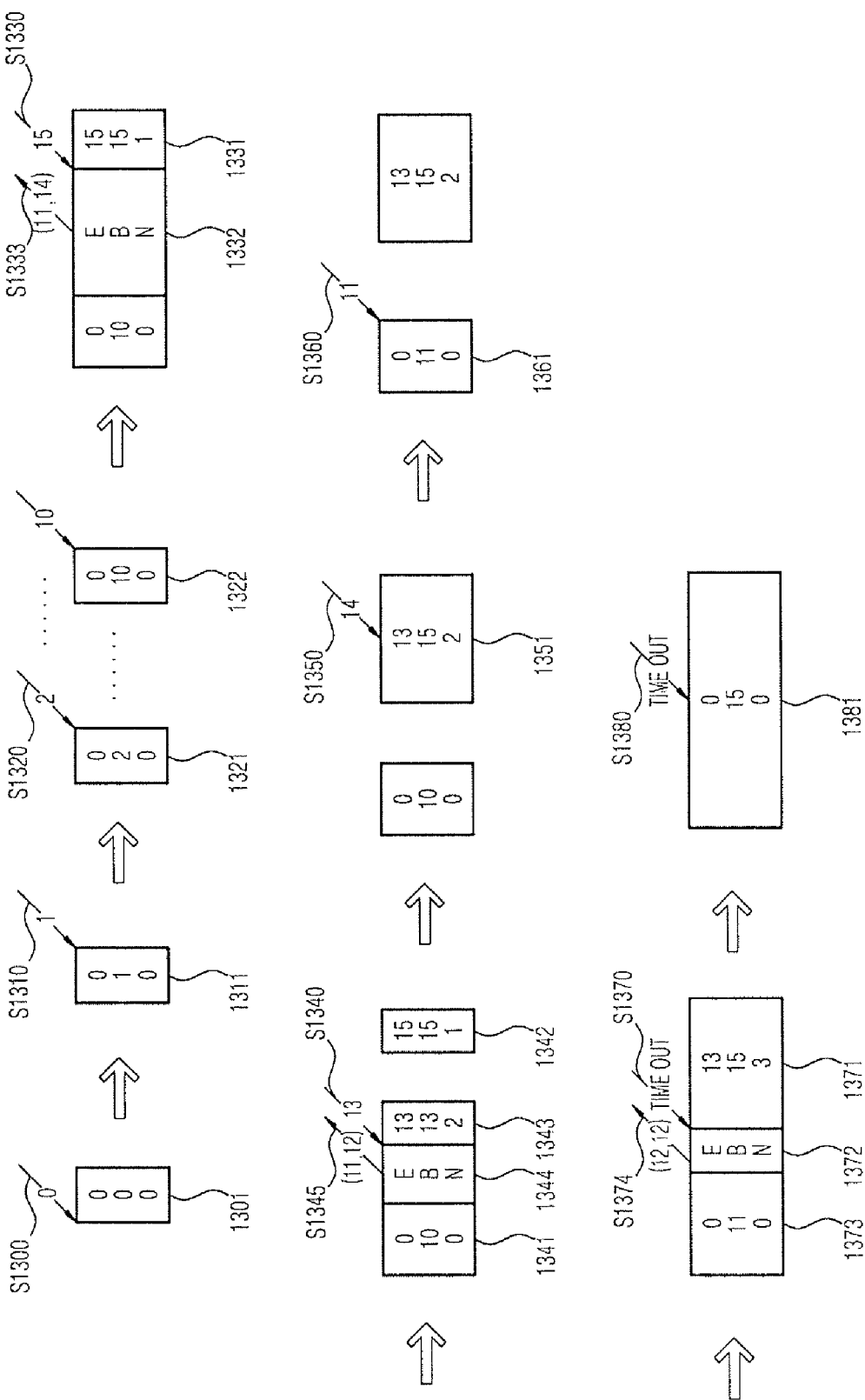
FIG. 13 is a view for explaining an example of a packet retransmission method according to an embodiment of the present invention.

FIG. 13 is a view for explaining an example of a packet retransmission method according to an embodiment of the present invention.

Referring to FIG. 13, first, it is assumed that the reception apparatus receives a packet having a sequence ID 0 (operation S1300). The reception apparatus then generates a reception block 1301 of (0 , 0, 0) for the received packet.

Next, it is assumed that the reception apparatus receives a packet having a sequence ID 1 (operation S1310). Here, the sequence ID of the packet is continuous with the sequence ID of the packet received in operation S1300, and thus an independent reception block is not generated, and the reception block 1301 of (0, 0, 0) is renewed by setting it to a reception block 1311 of (0, 1, 0).

It is assumed that the reception apparatus continuously receives packets having sequence IDs from 2 to 10 by means of the aforementioned process (operation S1320). At first, the existing reception block is renewed by setting it to a reception block 1321 of (0, 2, 0). When the packets having sequence IDs till 10 are continuously received, the reception block 1321 is correspondingly renewed as a reception block 1322 of (0, 10, 0).

Next, it is assumed that the reception apparatus receives a packet having a sequence ID 15 (operation S1330). The reception apparatus then perceives that a discontinuous sequence ID exists, and generates an independent reception block 1331. Thereafter, an EBN of (11, 14) for requesting retransmission of packets 1332 having sequence IDs between an end sequence ID of an immediately prior reception block and a start sequence ID of a newly generated reception block 1331 is transmitted (operation S1333). In addition, the number of retransmission requests of the reception block 1331 is increased by 1, so that the reception block 1331 becomes (15, 15, 1).

Next, it is assumed that a packet having a sequence ID 13 from among the packets that are requested to be retransmitted by means of the EBN of (11, 14) is received (operation S1340). The reception apparatus perceives that the sequence ID of the received packet, an end sequence ID of a reception block 1341, and a start sequence ID of a reception block 1342 are discontinuous, and generates an independent reception block 1343 of (13, 13, 1). A reason why the number of retransmission requests of the reception block 1343 being generated is 1 is that the reception block 1343 being generated is copied from the reception block 1342.

However, discontinuity still exists between the reception blocks 1341 and 1343, and thus an EBN of (11, 12) for requesting retransmission of the corresponding packets 1344 is transmitted (operation S1345), and the number of retransmission requests of the reception block 1343 is increased by 1. Thus, the reception block 1343 becomes (13, 13, 2).

Next, it is assumed that the reception apparatus receives a packet having a sequence ID 14 that was requested to be retransmitted by means of the EBN of (11, 14) (which was transmitted in operation S1333) (operation S1350). Since the sequence ID of the received packet is continuous with the reception blocks 1343 and 1342, a new reception block is not generated. Instead, an end sequence ID of the reception block 1343 is renewed by setting it to an end sequence ID of the reception block 1342, and the reception block 1342 is deleted. The reception block 1351 then becomes (13, 15, 2).

Next, it is assumed that the reception apparatus receives a packet having a sequence ID 11 that was requested to be retransmitted by means of the EBN of (11, 12) (which was transmitted in operation S1345) (operation S1360). In this case, the sequence ID of the received packet is continuous with the reception block 1341, so that the end sequence ID of the reception block 1341 is renewed by setting it to 11. The reception block 1361 becomes (0, 11, 0).

Next, it is assumed that a timer that was set when the EBN of (11, 12) (which was transmitted in operation S1345) was transmitted is expired (operation S1370).

The reception apparatus then increases the number of retransmission requests of a reception block 1371 by 1, and transmits again an EBN of (12, 12) for requesting retransmission of packets 1372 having a sequence ID between an end sequence ID 11 of the immediately prior reception block 1373 and a start sequence ID 13 of the reception block 1371 (operation S1374). The reception block 1371 then becomes (13, 15, 3).

Lastly, it is assumed that the timer which was set when the EBN of (12, 12) (which was transmitted in operation S1374) was transmitted is expired (operation S1380). In addition, it is assumed that a critical value of the number of retransmission requests of the reception apparatus according to the present embodiment is set to 3.

In this case, when the timer is expired in operation S1380, the sequence ID of the reception block 1371 and the sequence ID of the reception block 1373 are still discontinuous. However, since the number of retransmission requests of the reception block 1371 exceeds a permitted limit, retransmission is not requested any more. The corresponding packets are simply assumed to be received by the reception apparatus, so that the reception apparatus renews the end sequence ID of the reception block 1373 as the end sequence ID of the reception block 1371 and deletes the reception block 1371. As a result, the reception block 1381 then becomes (0, 15, 0).

Figure 14:
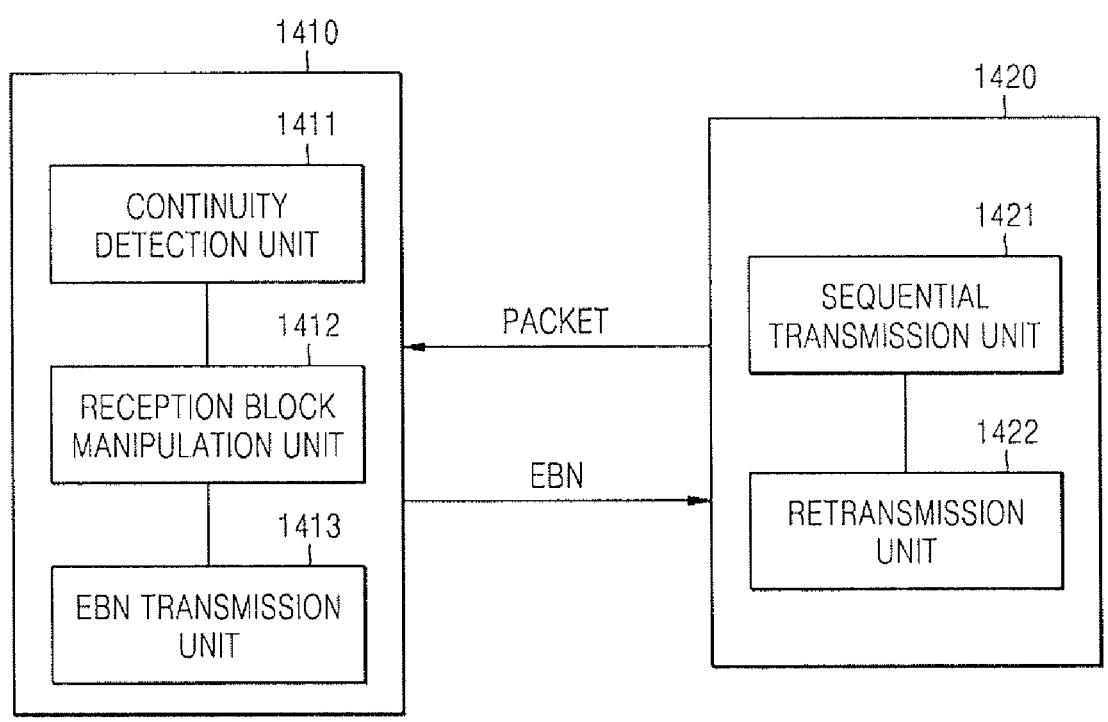
FIG. 14 is a block diagram showing structures of a packet retransmission request device in a reception apparatus and a packet retransmission device in a transmission apparatus according to another embodiment of the present invention.

FIG. 14 is a block diagram showing structures of a packet retransmission request device in a reception apparatus and a packet retransmission device in a transmission apparatus according to another embodiment of the present invention.

Referring to FIG. 14, a packet retransmission request device 1410 in the reception apparatus includes a continuity detection unit 1411 for detecting that a sequence ID of a received packet is continuous with a start sequence ID or an end sequence ID of packets included in reception blocks that are generated in advance, a reception block manipulation unit 1412 for renewing or deleting reception blocks or generating a new reception block by using the sequence ID of the received packet according to a result of detection, and an EBN transmission unit 1413 for transmitting an EBN for requesting retransmission of lost packets in units of a block when discontinuity is detected.

A detailed operating method used in the packet retransmission request device 1410 in the reception apparatus is referred to in the aforementioned description with reference to FIGS. 1 to 13.

Referring to FIG. 14, a packet retransmission device 1420 in the transmission apparatus includes a sequential transmission unit 1421 for transmitting packets while increasing sequence IDs of the packets by 1 without waiting for ACK signals from the reception apparatus in a wired/wireless network and a retransmission unit 1422 for retransmitting packets having sequence IDs included in the EBN when an EBN for requesting a retransmission of lost packets in units of a block is received from the reception apparatus.

A detailed operation method used in the packet retransmission device 1420 in the transmission apparatus is referred to in the aforementioned description with reference to FIGS. 1 to 13.

Accordingly, packets are requested in units of a block, so that the number of transmissions of NACKs decreases. Therefore, more data packets can be transceived.

In addition, overhead decreases, and the calculation complexity is lowered, so that the apparatus and method can be used for a subminiature device such as a sensor node.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A packet retransmission request method used in a reception apparatus in a wired/wireless network, the method comprising:
   detecting continuity by detecting whether or not a sequence ID of a received packet is continuous with a start sequence ID or an end sequence ID of packets included in reception blocks which are generated in advance of the received packet;
   depending on the result of the detection, manipulating reception blocks to be renewed or deleted or generating a new reception block by using the sequence ID of the received packet; and
   transmitting an Explicit Block NACK (EBN) for requesting retransmission of lost packets in units of a block when discontinuity is detected.

2. The method of claim 1, wherein the EBN comprises a start sequence ID and an end sequence ID of the lost packets.

3. The method of claim 1, wherein the reception block comprises a start sequence ID and an end sequence ID of packets which are continuously received without failure and the number of retransmission requests made by means of the EBN.

4. The method of claim 1, wherein when the sequence ID of the received packet is continuous with the start sequence ID or the end sequence ID of the reception blocks, in the manipulating of the reception blocks, the reception blocks are renewed by using the sequence ID of the received packet.

5. The method of claim 1,
   wherein when the sequence ID of the received packet is discontinuous with the start sequence ID or the end sequence ID of the reception blocks,
   in the manipulating of the reception blocks, a new reception block is generated, and
   in the transmitting of an EBN, an EBN for requesting retransmission of packets between a reception block immediately prior to the new reception block and the new reception block is generated.

6. The method of claim 5, wherein, when an s-bit representing that a packet including the s-bit has the earliest sequence ID from among packets that can be transmitted by a transmission apparatus is set in the received packet, retransmission is not requested.

7. The method of claim 1,
   wherein when the sequence ID of the received packet is discontinuous with an end sequence ID of a first reception block and is continuous with a start sequence ID of a second reception block which is disposed immediately after the first reception block,
   in the manipulating of the reception blocks, the second reception block is renewed, and
   in the transmitting an EBN, an EBN for requesting retransmission of packets between the first reception block and the renewed second reception block is transmitted.

8. The method of claim 1, wherein, in the manipulating of the reception blocks, when a timer which is set when the EBN is transmitted is expired, the reception block which transmitted the EBN is determined to exist in order to request a retransmission or terminate the retransmission operation.

9. The method of claim 1, wherein, when the number of retransmission requests made by means of the EBN exceeds a predetermined critical value, retransmission is not required, and the reception block is immediately renewed or deleted.

10. The method of claim 1, wherein the reception apparatus manages reception blocks corresponding to only the recent packets corresponding to the number of packets that are stored to be retransmitted by a transmission apparatus, and deletes reception blocks having sequence IDs less than a number obtained by subtracting the number of packets from a sequence ID of the most recent packet.

11. A packet retransmission request device used in a reception apparatus in a wired/wireless network, the device comprising:
   a continuity detection unit detecting that a sequence ID of a received packet is continuous with a start sequence ID or an end sequence ID of packets included in existing reception blocks;
   a reception block manipulation unit renewing or deleting the reception blocks or generating a new reception block by using the sequence ID of the received packet depending on the result of the detection; and
   an Explicit Block NACK (EBN) transmission unit transmitting an EBN for requesting retransmission of lost packets in units of a block when discontinuity is detected.

12. The device of claim 11, wherein the EBN comprises a start sequence ID and an end sequence ID of the lost packets.

13. The device of claim 11, wherein the reception block comprises a start sequence ID and an end sequence ID of packets which are continuously received without failure and the number of retransmission requests made by means of the EBN.

14. The device of claim 11, wherein, when the sequence ID of the received packet is continuous with the start sequence ID or the end sequence ID of the reception blocks, the reception block manipulation unit renews the reception blocks by using the sequence ID of the received packet.

15. The device of claim 11,
   wherein when the sequence ID of the received packet is discontinuous with the start sequence ID or the end sequence ID of the reception blocks,
   the reception block manipulation unit generates a new reception block, and
   the EBN transmission unit transmits an EBN for requesting retransmission of packets between a reception block immediately prior to the new reception block and the new reception block.

16. The device of claim 15, wherein, when an s-bit representing that a packet including the s-bit has the earliest sequence ID from among packets that can be transmitted by a transmission apparatus is set in the received packet, retransmission is not requested.

17. The device of claim 11,
   wherein when the sequence ID of the received packet is discontinuous with an end sequence ID of a first reception block and is continuous with a start sequence ID of a second reception block which is disposed immediately after the first reception block,
   the reception block manipulation unit renews the second reception block, and
   the EBN transmission unit transmits an EBN for requesting retransmission of packets between the first reception block and the renewed second reception block.

18. The device of claim 11, wherein, when a timer which is set when the EBN is transmitted is expired, the reception block manipulation unit detects whether or not the reception block which transmitted the EBN still exists in order to request a retransmission or terminate the retransmission operation.

19. The device of claim 11, wherein, when the number of retransmission requests made by means of the EBN exceeds a predetermined critical value, retransmission is not required, and the reception block is immediately renewed or deleted.

20. The device of claim 11, wherein the reception block manipulation unit manages reception blocks corresponding to only the recent packets corresponding to the number of packets that are stored to be transmitted by a transmission apparatus, and deletes reception blocks having sequence IDs less than a number obtained by subtracting the number of packets from a sequence ID of the most recent packet.

* * * * *